United States Patent
Shin et al.

(10) Patent No.: US 9,790,339 B2
(45) Date of Patent: Oct. 17, 2017

(54) CROSSLINKED SPEEK CATION EXCHANGE MEMBRANE HAVING IMPROVED CHEMICAL STABILITY BY RADIATION AND METHOD OF PREPARING THE SAME

(71) Applicant: KOREA ATOMIC ENERGY RESEARCH INSTITUTE, Daejeon (KR)

(72) Inventors: Junhwa Shin, Gwangju (KR); Joon Yong Sohn, Jeongeup (KR); Ju-Myung Song, Jeollanam-do (KR); Sun-Young Lee, Incheon (KR); Hyun-Su Woo, Gyeongsangnam-do (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 512 days.

(21) Appl. No.: 14/288,476

(22) Filed: May 28, 2014

(65) Prior Publication Data
US 2015/0133570 A1 May 14, 2015

(30) Foreign Application Priority Data
Nov. 11, 2013 (KR) .......................... 10-2013-0136427

(51) Int. Cl.
*C08J 5/22* (2006.01)
*H01M 8/10* (2016.01)
(Continued)

(52) U.S. Cl.
CPC .............. *C08J 5/2256* (2013.01); *C08J 3/24* (2013.01); *C08J 3/28* (2013.01); *H01M 8/1025* (2013.01);
(Continued)

(58) Field of Classification Search
USPC ............................................. 521/27; 264/488
See application file for complete search history.

(56) References Cited

U.S. PATENT DOCUMENTS 5,468,574 A * 11/1995 Ehrenberg .......... H01M 2/1653
429/493
5,679,482 A * 10/1997 Ehrenberg .......... H01M 2/1653
204/296
(Continued)

FOREIGN PATENT DOCUMENTS

| JP | 2009-067844 A | 4/2009 |
| KR | 10-20120113822 | * 10/2012 |
| KR | 1020120113822 A | 10/2012 |

OTHER PUBLICATIONS

Ju-Myung Song, et al., "Preparation and Characterization of SPEEK Membranes Crosslinked by Electron Beam Irradiation," Macromolecular Research, vol. 19, No. 10, pp. 1082-1089, Advanced Radiation Technology Institute, Korea Atomic Energy Research Institute, Jeonbuk, Korea, 2011.*

*Primary Examiner* — Mark Kaucher
*Assistant Examiner* — Henry Hu
(74) *Attorney, Agent, or Firm* — Hauptman Ham, LLP

(57) ABSTRACT

Provided is a method of preparing a crosslinked sulfonated poly(ether ether ketone) (SPEEK) cation exchange membrane including: preparing a crosslinker mixture of a first crosslinker containing two or more vinyl oxy groups and a second crosslinker containing three or more vinyl groups; preparing a mother liquor containing the crosslinker mixture, a SPEEK polymer substituted with sodium, and a solvent; and casting the mother liquor and then irradiating radiation thereon.

11 Claims, 3 Drawing Sheets

(51) Int. Cl.
*H01M 8/1081* (2016.01)
*H01M 8/1025* (2016.01)
*C08J 3/24* (2006.01)
*C08J 3/28* (2006.01)
*H01M 8/1018* (2016.01)
*H01M 8/1072* (2016.01)

(52) U.S. Cl.
CPC ....... *H01M 8/1081* (2013.01); *C08J 2371/00* (2013.01); *H01M 8/1072* (2013.01); *H01M 2008/1095* (2013.01); *Y02P 70/56* (2015.11)

(56) References Cited

U.S. PATENT DOCUMENTS

| | | | |
|---|---|---|---|
| 6,110,616 A | 8/2000 | Sheikh-Ali et al. | |
| 2006/0223895 A1* | 10/2006 | Yoshida | C08J 5/2281 521/27 |
| 2009/0176052 A1* | 7/2009 | Childs | B01D 67/0009 428/101 |
| 2012/0178834 A1* | 7/2012 | Linder | B01D 67/0006 521/27 |

\* cited by examiner

CROSSLINKED SPEEK CATION EXCHANGE MEMBRANE HAVING IMPROVED CHEMICAL STABILITY BY RADIATION AND METHOD OF PREPARING THE SAME

CROSS-REFERENCE TO RELATED APPLICATIONS

This application claims priority under 35 U.S.C. §119 to Korean Patent Application No. 10-2013-0136427, filed on Nov. 11, 2013, in the Korean Intellectual Property Office, the disclosure of which is incorporated herein by reference in its entirety.

TECHNICAL FIELD

The following disclosure relates to a cation exchange membrane usable as a fuel cell membrane, a water-treatment membrane, or the like, and a method of preparing the same. More particularly, the following disclosure relates to a sulfonated poly(ether ether ketone) (SPEEK) cation exchange membrane crosslinked using a mixture of a crosslinker containing two vinyl oxy groups and a crosslinker containing three vinyl groups, and a method of preparing the same.

BACKGROUND

After Maigrot and Sabate introduced an ion exchange membrane in 1890 while removing inorganic ions from sugar syrup using permanganic acid paper as a separation membrane, the ion exchange membrane has been widely used in various industrial fields. A process of separating and purifying a material using the ion exchange membrane is simple and has excellent selectivity for a specific ion, such that this process may be widely applied. An ion exchange membrane capable of selectively separating cations and anions in an aqueous solution has been widely used in a fuel cell, a secondary battery, a flow battery, a water-splitting electro-dialysis for recovering acid and base, diffusion dialysis for recovering acid and metal chemical species from pickling waste acid, an ultra pure water process, and the like.

Particularly, as uses of electronic products such as a small sized notebook, a mobile phone, and the like, have rapidly increased, recently, a demand for the development of the fuel cell using the ion exchange membrane has increased.

In the fuel cell, chemical energy is changed into electric energy by an electrochemical reaction Among the fuel cells, a polymer electrolyte fuel cell using a cation exchange membrane has excellent output characteristics, a low operation temperature, fast startup and response characteristics as compared to other fuel cells, such that the polymer electrolyte fuel cell may be variously applied in a distributed power supply for a house or a public building, a small power supply for electronic devices, or the like, as well as a portable type power supply for a vehicle. This polymer electrolyte fuel cell has been widely studied as an electrochemical apparatus for a convenient and efficient power resource.

A polymer electrolyte used as a cation exchange resin or cation exchange membrane in the fuel cell has been used for a long period of time and steadily studied. A cation exchange membrane, which is a cation exchange membrane, provides a layer for separately maintaining fuel and an oxidant in addition to having low resistance against diffusion of a proton from one electrode to the other electrode. In order to obtain high efficiency of the fuel cell, the cation exchange membrane should have high ionic conductivity and chemical, thermal, mechanical, and electrochemical stability. In addition, since the ionic conductivity is rapidly decreased at the time of dehydration, the cation exchange membrane should have resistance against dehydration.

Further, the cation exchange membrane should have durability and thermal, physical, and chemical stability so that the fuel cell may operate at a high temperature of 90 or more and in an ultimately acidic environment. Therefore, in addition to research into the cation exchange membrane, various researches into a cation exchange membrane used in a direct methanol fuel cell (DMFC), a polymer electrolyte membrane fuel cell (PEMFC, solid polymer electrolyte fuel cell, solid polymer fuel cell, or cation exchange membrane fuel cell) as a carrier transporting cations have been recently conducted.

Currently, as the cation exchange membrane widely and commonly used in a fuel cell field, there is Nafion® (Dupont, USA), which is a perfluoro sulfonic acid based cation exchange membrane. This fluorine based polymer has excellent mechanical properties, chemical stability, and ion conductivity but has disadvantages such as complicated synthetic materials or fabrication process, a high production cost, a low driving temperature (<100° C.), low stability in methanol, and the like.

Therefore, in order to overcome these disadvantages, a cation exchange membrane using a cheap hydrocarbon based polymer having excellent physical properties has been actively developed. A representative example of the hydrocarbon based polymer may include sulfonated poly(ether ether ketone) (SPEEK), sulfonated poly(aryl ether sulfone), a sulfonated phenol formal resin, sulfonated poly(phenylene oxide), phosphonic poly(phenylene oxide), sulfonated poly(benzylimidazole), and the like.

However, since ion conductivity of the cation exchange membrane as described above is in proportion to a sulfonation degree, in the case in which the sulfonation degree exceeds critical concentration, a decreased in a molecular weight may be inevitable. In addition, the mechanical properties of the cation exchange membrane may be decreased after being hydrated, and in this case, the membrane may not be used for a long time. In order to solve these problems, a method of preparing a polymer by using a sulfonated monomer and a method of selectively sulfonating a polymer have been developed (U.S. Pat. Nos. 5,468,574, 5,679,482, and 6,110,616), but the problem such as stability at a high temperature and problems generated at the time of use for a long period of time have not been completely solved.

A cation exchange membrane using sulfonated poly(ether ether ketone) (SPEEK) among the hydrocarbon based polymers has excellent mechanical properties and thermal stability and may be cheaply prepared. However, in the case of excessively introducing a sulfonic acid group in order to improve ion conductivity, since SPEEK excessively absorbs water, the mechanical strength and dimensional stability of the cation exchange membrane are rapidly decreased, such that there is a limitation in using the cation exchange membrane as a fuel cell membrane. In order to solve this problem, research into a technology of introducing a crosslinking structure in SPEEK to improve dimensional stability, mechanical property, and chemical stability under fuel cell driving conditions has been actively conducted.

In order to introduce a crosslinking structure in a hydrocarbon based polymer electrolyte membrane for a fuel cell, various methods such as a method of using heat or ultraviolet (UV) rays, and the like, have been used. In the case of crosslinking by means of heat, a long crosslinking process at a high temperature is required, and in the case of crosslinking by means of UV rays, it may be impossible to form a uniform crosslinking structure due to contamination caused by use of an initiator and low transmittance. Meanwhile, a crosslinking technology using radiation has advantageous in that the initiator is not required, a dense crosslinking structure may be formed up to an internal portion of a polymer electrolyte membrane due to high transmittance of the radiation, and a time consumed in a preparation process may be decreased.

The present inventor has developed a hydrocarbon based polymer electrolyte membrane having improved thermal stability and dimensional stability by mixing a crosslinker mixture having a vinyl ester structure and a hydrocarbon based polymer and irradiation (Korean Patent No. 10-1267979). However, in the hydrocarbon based polymer electrolyte membrane, in the case of using an ester group in a crosslinker structure for a long period of time, the crosslinker may be decomposed. Therefore, research into a novel material capable of having excellent thermal, mechanical, and chemical stability and increasing dimensional stability by introducing a crosslinking structure in a hydrocarbon based polymer electrolyte membrane using radiation and capable of being easily prepared has been urgently demanded.

SUMMARY

An embodiment of the present invention is directed to providing a crosslinked sulfonated poly(ether ether ketone) (SPEEK) cation exchange membrane having excellent chemical stability as well as mechanical properties and dimensional stability, and a method of preparing the same.

An embodiment of the present invention is also directed to providing a fuel cell membrane or a water treatment membrane using the cation exchange membrane.

In one general aspect, a method of preparing a crosslinked SPEEK cation exchange membrane includes: preparing a crosslinker mixture of a first crosslinker containing two vinyl oxy groups and a second crosslinker containing three vinyl groups; preparing a mother liquor containing the crosslinker mixture, a SPEEK polymer substituted with sodium, and a solvent; and casting the mother liquor and then irradiating radiation thereon.

The first crosslinker may be a compound represented by the following Chemical Formula 1.

[Chemical Formula 1]

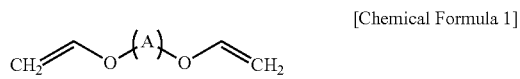

(In Chemical Formula 1, A is any one selected from

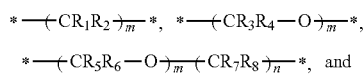

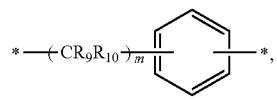

$R_1$ to $R_{10}$ are each independently hydrogen or $(C_1\text{-}C_6)$ and m and n are integers of 1 to 5, respectively.)

In the crosslinker mixture, 60 to 95 wt % of the first crosslinker and 5 to 40 wt % of the second crosslinker may be mixed with each other.

The mother liquor may contain 0.1 to 20 wt % of the crosslinker mixture, 1 to 30 wt % of the SPEEK polymer substituted with sodium, and 65 to 95 wt % of a solvent.

The first crosslinker may contain any one or at least two selected from 1,4-butanediol divinyl ether, 1,6-hexanediol ether, di(ethylene glycol)divinyl ether, tri(ethylene glycol) divinyl ether, tetra(ethylene glycol)divinyl ether, and 1,4-cyclohexanedimethanol divinyl ether.

The second crosslinker may contain any one or a mixture of at least two selected from triallyl isocyanurate and pentaerythritol triallyl ether.

The solvent may be any one or a mixture of at least two selected from a group consisting of N,N-dimethylacetamide, N-methyl-2-pyrrolidone, dimethylsulfoxide, tetrahydrofuran, dimethylformamide, toluene, cyclohexane, benzene, chlorobenzene, diphenylether, and 1,3,5-trimethylbenzene.

The radioactive ray may be any one selected from a group consisting of gamma ray, UV ray, and electron ray.

The radioactive ray may be irradiated at a dose rate of 0.1 to 10 kGy/min and an irradiation dose of 50 to 600 kGy.

In another general aspect, there is provided a crosslinked sulfonated poly(ether ether ketone) (SPEEK) cation exchange membrane prepared by the method as described above.

In another general aspect, there is provided a fuel cell membrane comprising the crosslinked SPEEK cation exchange membrane as described above In another general aspect, there is provided a water treatment membrane comprising the crosslinked SPEEK cation exchange membrane as described above.

DETAILED DESCRIPTION OF EMBODIMENTS

Figure 1:
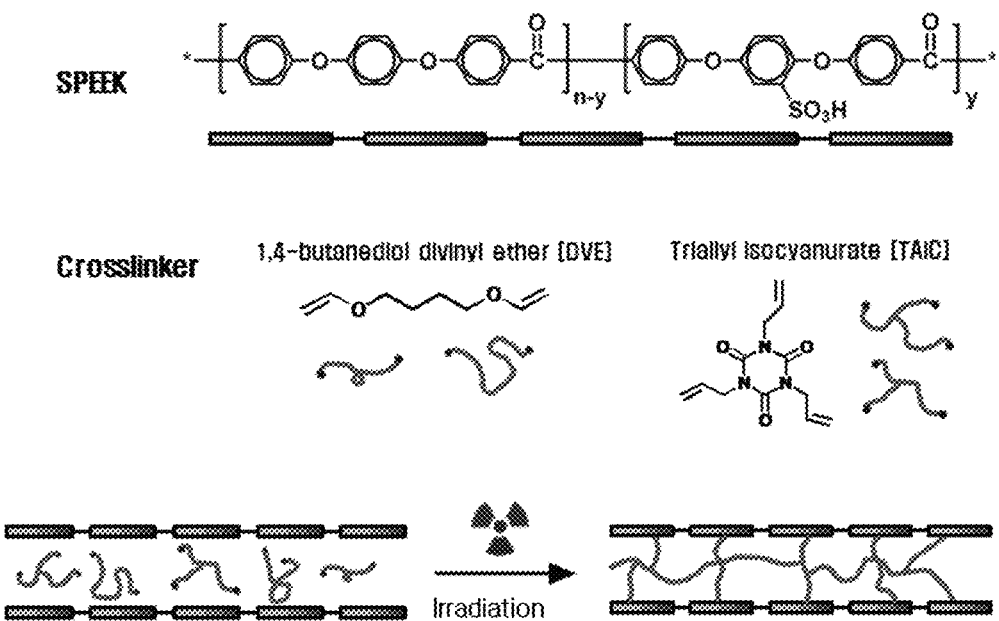
FIG. 1 is a schematic view showing a process of preparing a crosslinked SPEEK cation exchange membrane according to the present invention.

Hereinafter, a method of preparing a crosslinked SPEEK cation exchange membrane according to the present invention will be described in detail. The exemplary embodiments of the present invention to be described below are provided by way of example so that the idea of the present invention can be sufficiently transferred to those skilled in the art to which the present invention pertains. Here, technical terms and scientific terms used in the present specification have the general meaning understood by those skilled in the art to which the present invention pertains unless otherwise defined, and a description for the known function and configuration obscuring the present invention will be omitted in the following description.

The method of preparing a crosslinked SPEEK cation exchange membrane according to the present invention may include:

(step 1) preparing a crosslinker mixture of a first crosslinker containing two vinyl oxy groups and a second crosslinker containing three vinyl groups;

(step 2) preparing a mother liquor containing the crosslinker mixture, a SPEEK polymer substituted with sodium, and a solvent; and (step 3) casting the mother liquor and then irradiating radiation thereonto.

In detail, in the present invention, step 1 is a step of preparing the crosslinker mixture in order to improve dimensional stability of the cation exchange membrane.

The first crosslinker may be a compound represented by the following Chemical Formula 1.

[Chemical Formula 1]

$$CH_2=CH-O-(A)-O-CH=CH_2$$

(In Chemical Formula 1, A is any one selected from $$*-(CR_1R_2)_{\overline{m}}-*, \quad *-(CR_3R_4-O)_{\overline{m}}-*,$$

$$*-(CR_5R_6-O)_{\overline{m}}-(CR_7R_8)_{\overline{n}}-*, \text{ and}$$

$$*-(CR_9R_{10})_{\overline{m}}-\phenyl-*,$$

$R_1$ to $R_{10}$ are each independently hydrogen or $(C_1 \sim C_6)$ and m and n are integers of 1 to 5, respectively.)

In this case, in the first crosslinker of Chemical Formula 1, A may be, for example, a compound represented by Chemical Formulas 2 to 7, but is not necessarily limited thereto.

[Chemical Formula 2]

[Chemical Formula 3]

[Chemical Formula 4]

[Chemical Formula 5]

[Chemical Formula 6]

[Chemical Formula 7]

The first crosslinker may be any one or at least two selected from a group consisting of 1,4-butanediol divinyl ether, 1,6-hexanediol divinyl ether, di(ethylene glycol)divinyl ether, tri(ethylene glycol)divinyl ether, tetra(ethylene glycol)divinyl ether, and 1,4-cyclohexanedimethanol divinyl ether, but is not necessarily limited thereto.

The second crosslinker may be any one or a mixture of at least two selected from compounds represented by the following Chemical Formulas 8 and 9.

[Chemical Formula 8]

[Chemical Formula 9]

The second crosslinker may be any one or a mixture of at least two selected from a group consisting of triallyl isocyanurate (TAIC) and pentaerythritol triallyl ether (PETALE), but is not necessarily limited thereto.

In the present invention, the crosslinker mixture may improve mechanical strength and may be a mixture in which 60 to 95 wt % of the first crosslinker and 5 to 40 wt % of the second crosslinker are mixed with each other in order to secure excellent thermal, chemical, and electrochemical stability. More preferably, the crosslinker mixture may be a mixture in which 80 to 90 wt % of the first crosslinker and 10 to 20 wt % of the second crosslinker are mixed with each other in order to further improve a gel-fraction and dimensional stability of the crosslinked SPEEK cation exchange membrane to secure excellent mechanical properties and electrochemical stability.

In the case in which a content of the first crosslinker is less than 60 wt %, physical strength may be increased, but flexibility may be decreased, such that the prepared membrane may be easily broken, and in the case in which the content is more than 95 wt %, flexibility may be increased, but it may be difficult to secure dimensional stability.

Further, in the case in which a content of the second crosslinker is less than 5 wt %, mechanical strength and dimensional stability may be deteriorated, and in the case in which the content is more than 40 wt %, crosslinking density is excessively increased, such that impact strength may be deteriorated.

In the present invention, step 2 is a step of preparing the mother liquor of a SPEEK cation exchange membrane substituted with sodium. More specifically, the mother liquor may be prepared by dissolving the SPEEK polymer substituted with sodium and the crosslinker mixture prepared in step 1 in the solvent at room temperature.

As an aspect of the SPEEK polymer substituted with sodium of step 2, protons of a sulfonic acid group may be substituted with a sodium ion by dipping the SPEEK polymer in 1M sodium chloride for 12 to 48 hours. In the case in which the proton of the sulfonic acid group is not substituted with sodium, a vinyl ether crosslinker may be hydrolyzed due to the proton of the sulfonic acid group during a process of evaporating the solvent. In addition, the SPEEK polymer may be substituted with a proton or alkali metal ion form as well as the sodium ion. In this case, reactivity with the crosslinker mixture may be improved.

As the solvent, any one or a mixture of at least two selected from a group consisting of N,N-dimethylacetamide (DMAc), N-methyl-2-pyrrolidone (NMP), dimethylsulfoxide (DMSO), tetrahydrofuran, dimethylformamide, toluene, cyclohexane, benzene, chlorobenzene, diphenylether, and 1,3,5-trimethylbenzene may be used. Preferably, a polar solvent such as N,N-dimethylacetamide (DMAc), N-methyl-2-pyrrolidone (NMP), dimethylsulfoxide (DMSO), and the like, may be used alone, or a mixture thereof may be used, but the present invention is not necessarily limited thereto.

In the present invention, the mother liquor may contain 0.1 to 20 wt % of the crosslinker mixture, 1 to 30 wt % of the SPEEK polymer substituted with sodium, and 65 to 95 wt % of the solvent. In this case, when a content of the solvent is less than 65 wt %, dispersibility may be deteriorated, and crosslinking density may be increased, and when the content is more than 95 wt %, it may be difficult to form a membrane.

In step 2 of the present invention, the SPEEK polymer substituted with sodium may form a backbone of the cation exchange membrane. In addition to the SPEEK polymer substituted with sodium, another polymer such as a sulfonated poly(aryl ether sulfone) polymer substituted with sodium, a sulfonated poly(imide) polymer substituted with sodium, a sulfonated poly(phenylene oxide) substituted with sodium, or the like, may be used, but the present invention is not necessarily limited thereto.

In this case, the SPEEK polymer substituted with sodium may be contained at a content of 5 to 30 wt % based on a total weight of the mother liquor. In the case in which the content of the SPEEK polymer substituted with sodium is less than 5 wt %, the cation exchange membrane may not have sufficient ion conductivity, and in the case in which the content is more than 30 wt %, dimensional stability may be deteriorated.

In the present invention, step 3 is a step of casting the mother liquor and then irradiating the cast mother liquor. More specifically, step 3 may include, after a step of casting and drying the mother liquor onto a glass plate, a step of irradiating and drying the mother liquor.

As an aspect of the process of casting and drying the mother liquor, the mother liquor is uniformly sprayed onto a glass plate having a suitable size at room temperature using a solution casting method and then dried at 60 to 80° C. for 1 to 2 hours, thereby evaporating the solvent. In the case of performing the drying process under the above-mentioned conditions, the solvent partially remains, such that the formed membrane has a viscosity at which the solution does not flow.

The membrane prepared by casting and then drying the mother liquor is irradiated, such that the crosslinker and the SPEEK polymer substituted with sodium are crosslinked to each other, thereby making it possible to improve mechanical strength. As an aspect, the crosslinked SPEEK cation exchange membrane may be prepared by irradiating the membrane formed on the glass plate by evaporating the solvent, vacuum-drying the irradiated membrane at 100 to 140° C. for 10 to 14 hours to remove the remaining solvent, followed by cooling to room temperature and separating the prepared crosslinked SPEEK cation exchange membrane from the glass plate using distilled water.

As the radiation, any one or more selected from a group consisting of gamma rays, UV rays, and electron rays may be irradiated. Preferably, the electron ray may be irradiated.

In addition, the radiation may be irradiated at a dose rate of 0.1 to 10 kGy/min and an irradiation dose of 50 to 600 kGy. Preferably, the radiation may be irradiated at a dose rate of 1 to 7 kGy/min and an irradiation dose of 200 to 400 kGy.

In the case in which the irradiation dose of the radiation is less than 50 kGy, sufficient crosslinking is not performed, and in the case in which the irradiation dose is more than 600 kGy, breakage between molecules may be generated, such that mechanical strength may be deteriorated due to a decrease in a molecular weight.

The method of preparing a crosslinked SPEEK cation exchange membrane according to the present invention may further include, after step 3, a process of removing impurities by washing and drying the crosslinked SPEEK cation exchange membrane. As an aspect of the process of removing the impurities, the prepared cation exchange membrane may be dipped in 0.5 to 2M aqueous HCl solution for 12 to 72 hours to remove the impurities, sodium may be substituted with hydrogen, and then the obtained cation exchange membrane may be dried.

The crosslinked SPEEK cation exchange membrane prepared according to the present invention by mixing the crosslinker mixture composed of the first crosslinker containing two or more vinyl oxy groups and the second crosslinker containing three or more vinyl groups with the SPEEK polymer substituted with sodium at a suitable composition ratio and irradiating radiation may be prepared at room temperature in a short time and maintain high ionic conductivity in addition to a sufficient gel fraction and high chemical stability and dimensional stability, such that the crosslinked SPEEK cation exchange membrane may be applied as an ion exchange membrane, the fuel cell membrane, the flow battery membrane for a high capacitance secondary battery, the water treatment membrane, and the like, in various industrial fields.

Hereinafter, the present invention will be described in detail through Examples. However, the following Examples are to illustrate the present invention, and the scope of the present invention is not limited to the following Examples.

(Example 1) Preparation of Polymer Electrolyte Membrane Using Crosslinked SPEEK as Basic Backbone by Irradiation Crosslinking Method A crosslinked SPEEK cation exchange membrane according to the present invention, having improved thermal stability and dimensional stability by using sulfonated poly (ether ether ketone) (SPEEK) as a basic backbone was prepared as shown in FIG. 1.

Step 1. Preparing of Crosslinker Mixture 1,4-butanediol divinyl ether and trially isocyanurate were mixed at a weight mixing ratio of 9:1, thereby preparing a crosslinker mixture at room temperature.

Step 2. Preparing of Mother Liquor

Sulfonated SPEEK substituted with sodium and the crosslinker mixture prepared in step 1 were mixed in N,N-dimethylacetamide (DMAc) at a composition ratio shown in the following Table 1, thereby preparing a mother liquor at room temperature.

Step 3. Casting and Drying of Mother Liquor onto Glass Plate

The mother liquor prepared in step 2 was uniformly sprayed onto a glass plate (15 cm×15 cm) at room temperature using a solution casting method. The glass plate onto which the mother liquor was sprayed was dried at a high temperature of 70° C., thereby evaporating N,N-dimethylacetamide (DMAc) for 1 hour.

Step 4. Irradiating and Drying Glass Plate

Electron ray was irradiated onto the glass plate on which the solvent was evaporated at a dose rate of 6 kGy/min and an irradiation dose shown in Table 1. The irradiated glass plate was vacuum-dried at 100° C. for about hours to remove the remaining DMAc solvent and then cooled to room temperature. Then, the prepared polymer electrolyte membrane was separated from the glass plate using distilled water. Finally, the prepared polymer electrolyte membrane was put into 1M aqueous HCl solution for 48 hours to remove impurities, thereby preparing a crosslinked SPEEK cation exchange membrane according to the present invention.

Examples 2 to 20

The same method as that in Example 1 was performed using compositions shown in the following Table 1.

TABLE 1

| Classification | Content of SPEEK (wt %) | Content of crosslinker mixture (wt %) | Content of solvent (wt %) | Irradiation dose (kGy) |
|---|---|---|---|---|
| Example 1 | 10 | 0.5 | 89.5 | 50 |
| Example 2 | 10 | 0.5 | 89.5 | 100 |
| Example 3 | 10 | 0.5 | 89.5 | 200 |
| Example 4 | 10 | 0.5 | 89.5 | 300 |
| Example 5 | 10 | 1.1 | 88.9 | 50 |
| Example 6 | 10 | 1.1 | 88.9 | 100 |
| Example 7 | 10 | 1.1 | 88.9 | 200 |
| Example 8 | 10 | 1.1 | 88.9 | 300 |
| Example 9 | 10 | 2.5 | 87.5 | 50 |
| Example 10 | 10 | 2.5 | 87.5 | 100 |
| Example 11 | 10 | 2.5 | 87.5 | 200 |
| Example 12 | 10 | 2.5 | 87.5 | 300 |
| Example 13 | 10 | 4.3 | 85.7 | 50 |
| Example 14 | 10 | 4.3 | 85.7 | 100 |
| Example 15 | 10 | 4.3 | 85.7 | 200 |
| Example 16 | 10 | 4.3 | 85.7 | 300 |
| Example 17 | 10 | 6.7 | 83.3 | 50 |
| Example 18 | 10 | 6.7 | 83.3 | 100 |
| Example 19 | 10 | 6.7 | 83.3 | 200 |
| Example 20 | 10 | 6.7 | 83.3 | 300 |

Examples 21 to 26

The same method as that in Example 16 was performed using the compositions shown in the following Table 2 while changing a mixing ratio of the first crosslinker and the second crosslinker in the crosslinker mixture.

TABLE 2

| Classification | Content of SPEEK (wt %) | Content of crosslinker mixture (wt %) 1,4-Butanediol divinyl ether | Trially isocyanurate | Content of solvent (wt %) | Irradiation dose (kGy) |
|---|---|---|---|---|---|
| Example 21 | 10 | 4.085 | 0.215 | 85.7 | 300 |
| Example 22 | 10 | 3.440 | 0.860 | 85.7 | 300 |
| Example 23 | 10 | 3.010 | 1.290 | 85.7 | 300 |
| Example 24 | 10 | 2.580 | 1.720 | 85.7 | 300 |
| Example 25 | 10 | 4.150 | 0.150 | 85.7 | 300 |
| Example 26 | 10 | 2.150 | 2.150 | 85.7 | 300 |

(Comparative Example 1) Preparation of Sulfonated poly(ether ether ketone) Cation Exchange Membrane A polymer electrolyte membrane having a hydrocarbon based crosslinking structure using sulfonated poly(ether ether ketone) (SPEEK) substituted with sodium as a basic backbone was prepared.

Step 1. Preparing of Mother Liquor 90 wt % of N,N-dimethylacetamide (DMAc) and 10 wt % of SPEEK were mixed with each other, thereby preparing a mother liquor at room temperature.

Step 2. Casting and Drying of Mother Liquor onto Glass Plate

The mother liquor prepared in step 1 was uniformly sprayed onto a glass plate (15 cm×15 cm) at room temperature using a solution casting method. The glass plate onto which the mother liquor was sprayed was vacuum-dried at 120° C. for about 12 hours to remove the remaining DMAc and then cooled to room temperature. Then, the prepared polymer electrolyte membrane was separated from the glass plate using distilled water. Finally, the prepared polymer electrolyte membrane was put into 1M aqueous HCl solution for 48 hours to remove impurities, thereby preparing a crosslinked SPEEK cation exchange membrane of Comparative Example.

(Comparative Example 2) Preparation of Sulfonated poly(ether ether ketone) Cation Exchange Membrane The same method as that in Example 16 was performed except for using a mother liquor obtained by mixing 85.7 wt % of N,N-dimethylacetamide (DMAc) and 10 wt % of SPEEK with 4.3 wt % of divinylbenzene (DVB) as a crosslinker at room temperature.

(Comparative Example 3) Preparation of Sulfonated poly(ether ether ketone) Cation Exchange Membrane The same method as that in Example 16 was performed except for using a mother liquor obtained by mixing 85.7 wt % of N,N-dimethylacetamide (DMAc) and 10 wt % of SPEEK with 4.3 wt % of 1,4-butanediol divinyl ether as a crosslinker at room temperature.

(Comparative Example 4) Preparation of Sulfonated poly(ether ether ketone) Cation Exchange Membrane The same method as that in Example 16 was performed except for using a mother liquor obtained by mixing 85.7 wt % of N,N-dimethylacetamide (DMAc) and 10 wt % of SPEEK with 4.3 wt % of trially isocyanurate as a crosslinker at room temperature.

(Experimental Example 1) Measurement Gel-Fraction

In order to confirm gel-fractions of the crosslinked SPEEK cation exchange membranes prepared in Examples and Comparative Examples, experiments were performed as follows. In detail, after dipping the crosslinked SPEEK cation exchange membranes prepared in Examples and Comparative Examples into DMAc, which is a solvent used before irradiating the electron rays, for one day, changes in the weight were observed, and then gel-fractions were calculated by the following Equation 1. The results were shown in FIG. 2.

$$\text{Gel Fraction (\%)} = \frac{W_{dry} - W_{dissolved}}{W_{dry}} \times 100 \quad \text{[Equation 1]}$$

In Equation 1, $W_{dry}$ is a weight of the crosslinked SPEEK cation exchange membrane before dipping it in DMAc, and $W_{dissolved}$ is a weight of the crosslinked SPEEK cation exchange membrane after dipping it in DMAc for 1 day.

Figure 2:
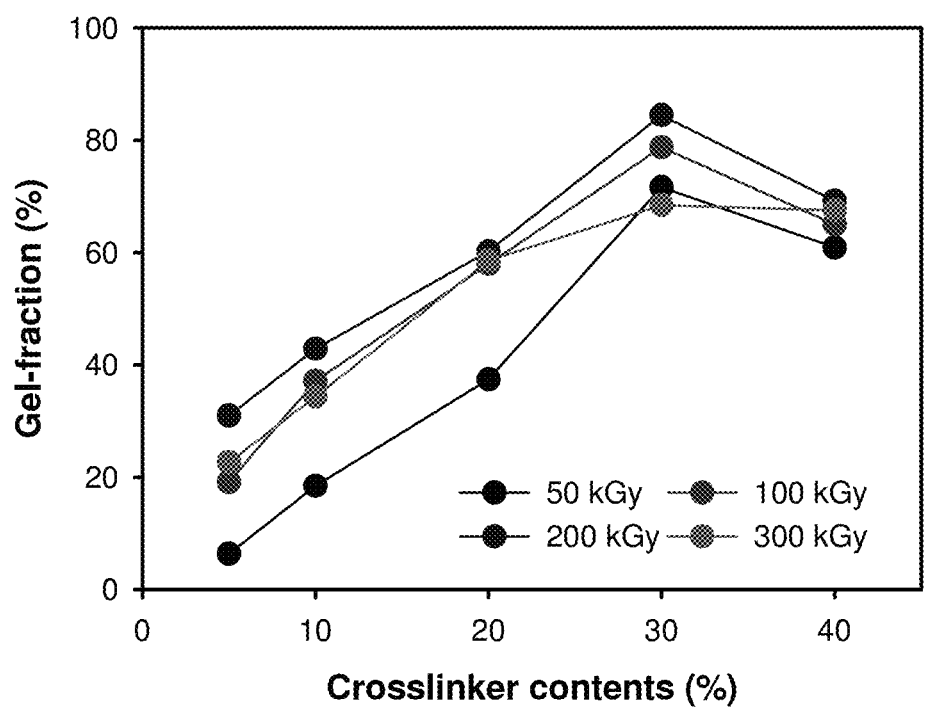
FIG. 2 is a graph obtained by measuring a gel-fraction of a crosslinked SPEEK cation exchange membrane according to Examples of the present invention.

FIG. 2 is a graph obtained by measuring the gel-fraction of the crosslinked cation exchange membrane according to Example of the present invention. It may be confirmed that in the case in which an irradiation dose was 200 kGy or more, the gel fraction of the crosslinked cation exchange membrane was over 40%, such that the crosslinked cation exchange membrane had a sufficient gel fraction.

Table 3 shows results obtained by measuring the gel-fractions of the prepared crosslinked SPEEK cation exchange membrane. As shown in the following Table 3, in the crosslinked SPEEK cation exchange membrane of Comparative Example 2 prepared using divinyl benzene, which is mainly used as an irradiation crosslinker, as a crosslinker, the gel fraction was less than 10%, which was lower than the gel fraction in Example. Further, in the crosslinked SPEEK cation exchange membrane of Comparative Example 2 prepared using only the first crosslinker and the crosslinked SPEEK cation exchange membrane of Comparative Example 4 prepared using only the second crosslinker, low gel-fractions (about 20%) were obtained. On the contrary, it may be confirmed that in the crosslinked SPEEK cation exchange membranes of Examples prepared using the mixture of the first and second crosslinkers, a crosslinking structure may be more easily formed by irradiation as compared to the crosslinked SPEEK cation exchange membranes of Comparative Examples 3 and 4 respectively prepared using the first crosslinker alone and the second crosslinkers alone.

TABLE 3

| Classification | SPEEK | 1,4-Butanediol divinyl ether (wt %) | Trially isocyanurate (wt %) | Divinyl benzene (wt %) | Irradiation dose (kGy) | Gel-fraction (%) |
|---|---|---|---|---|---|---|
| Comparative Example 1 | 10 | 0 | 0 | 0 | 0 | 0 |
| Comparative Example 2 | 10 | 0 | 0 | 4.3 | 300 | 7.82 |
| Comparative Example 3 | 10 | 4.3 | 0 | 0 | 300 | 22.34 |
| Comparative Example 4 | 10 | 0 | 4.3 | 0 | 300 | 20.48 |
| Example 16 | 10 | 3.870 | 0.430 | 0 | 300 | 69.20 |
| Example 21 | 10 | 4.085 | 0.215 | 0 | 300 | 65.53 |
| Example 22 | 10 | 3.440 | 0.860 | 0 | 300 | 49.10 |
| Example 23 | 10 | 3.010 | 1.290 | 0 | 300 | 39.10 |
| Example 24 | 10 | 2.580 | 1.720 | 0 | 300 | 34.56 |
| Example 25 | 10 | 3.150 | 0.150 | 0 | 300 | 24.52 |
| Example 26 | 10 | 2.150 | 2.150 | 0 | 300 | 25.62 |

(Experimental Example 2) Measurement of Ion Exchange Capacity (IEC)

In order to confirm IEC of the crosslinked cation exchange membranes prepared in Examples 4, 8, 12, 16, and 20, experiments were performed using a neutralization titration method as follows. In detail, the crosslinked cation exchange membranes prepared in Examples 4, 8, 12, 16, and 20 were put into 3M NaCl solution for 24 hours to neutralize H+ of the sulfonic group into Na+ form, and then reverse neutralization titration was performed using 0.1M NaOH. An automatic titrator DL22 (Mettler Toledo Company, Switzerland) was used for accurate neutralization titration. IEC values were calculated using the following Equation 2, and the results were shown in FIG. 3.

$$IEC(\text{meq/g}) = \frac{C_{NaOH} - V_{NaOH}}{W_{dry}} \quad \text{[Equation 2]}$$

In Equation 2, $C_{NaOH}$ is a concentration of NaOH solution, $V_{NaOH}$ is a volume of 0.1M NaOH solution used in the neutralization titration, and $W_{dry}$ is a weight of the crosslinked cation exchange membrane in a dry state.

Figure 3:
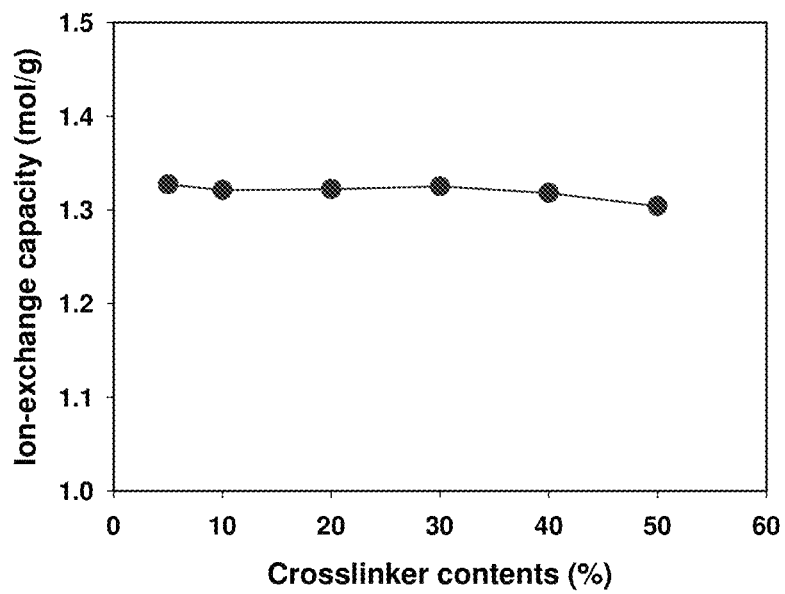
FIG. 3 is a graph obtained by measuring ion-exchange capacity of crosslinked SPEEK cation exchange membranes according to Examples of the present invention and Comparative Examples.

FIG. 3 is a graph obtained by measuring ion exchange capacity of the cation exchange membranes having the crosslinking structure prepared according to Examples of the present invention and Comparative Examples. It may be confirmed that the ion exchange capacity of the cation exchange membranes prepared by the radiation crosslinking method in Examples 4, 8, 12, 16, and 20 was 1.3 meq/g or more.

(Experimental Example 3) Measurement of Water Uptake

In order to confirm water uptake of the cation exchange membranes prepared in Comparative Example 1 and Examples 4, 8, 16, and 20, experiments were performed as follows. In detail, after the cation exchange membranes prepared in Comparative Example 1 and Examples 4, 8, 16, and 20 were put into distilled water at 30, 50, and 70° C., water remaining in surfaces of the cation exchange membranes was removed, and changes in the weight were observed. Then, water uptake was calculated using the following Equation 3, and the results were shown in FIG. 4.

$$\text{Water Uptake}(\%) = \frac{W_s - W_d}{W_d} \times 100 \quad \text{[Equation 3]}$$

Here, $W_d$ is a weight of the dried membrane, and $W_s$ is a weight of the membrane absorbing water.

Figure 4:
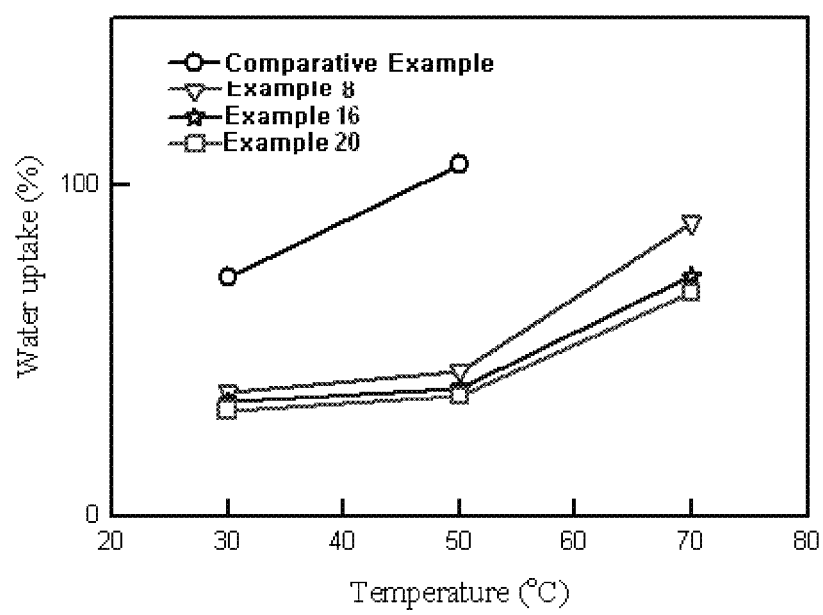
FIG. 4 is a graph obtained by measuring water uptake of the crosslinked SPEEK cation exchange membrane according to Example of the present invention.

FIG. 4 is a graph obtained by measuring water uptake of the cation exchange membrane according to Examples of the present invention. It may be confirmed that the water uptake was increased as the temperature of the cation exchange membrane prepared in Comparative Example 1 and Examples 4, 8, 12, 16, and 20 was increased. Meanwhile, it may be confirmed that the water uptake was decreased in accordance with the increase of the content of the crosslinker.

(Experimental Example 4) Measurement of Ionic Conductivity

In order to confirm ionic conductivity of the polymer electrolyte membranes prepared in Example, experiments were performed as follows. In detail, resistance of the cation exchange membranes prepared in Examples 4, 8, 12, 16, and 20 was measured using an AC impedance analyzer (SI 1260, Solatron Company). In this case, impedance was measured according to the change in a temperature in a frequency range of 0.01 to 100 kHz, and the ionic conductivity was calculated using the following Equation 4. The results were shown in FIG. 5.

$$\text{Proton Conductivity}(\sigma, \text{S/cm}) = \frac{L}{A \times R} \quad \text{[Equation 4]}$$

In Equation 4, L is a distance between two electrodes, A is an area of the polymer electrolyte membrane in a thickness direction, and R is electric resistance.

Figure 5:
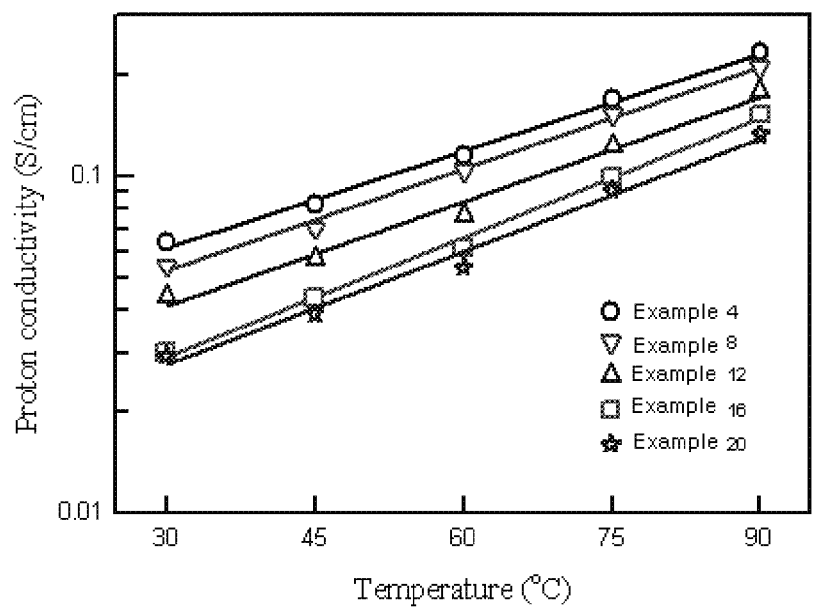
FIG. 5 shows results obtained by measuring ioninc conductivity of the cation exchange membrane according to Example of the present invention.

FIG. 5 is a graph obtained by measuring ionic conductivity of the cation exchange membrane according to Examples of the present invention. It may be confirmed that the crosslinked ionic conductivity of the cation exchange membrane prepared in Examples 4, 8, 12, 16, and 20 was increased in accordance with the increase of the temperature. In addition, it may be confirmed that the ionic conductivity of all of the crosslinked cation exchange membranes was $10^{-2}$ S/cm or more.

(Experimental Example 5) Evaluation of Chemical Stability (Fenton's Reagent Test)

In order to confirm chemical stability of the cation exchange membranes prepared in Comparative Example 1 and Examples 4, 8, 12, 16, and 20, experiments were performed as follows. In detail, the crosslinked cation exchange membranes prepared in Examples 4, 8, 12, 16, and 20 and the cation exchange membrane prepared in Comparative Example 1 were put into distilled water for one day, such that the cation exchange membranes were sufficiently swelled. An initial weight of the swelled electrolyte membrane was measured (in this case, measurement was performed after water in the surface of the electrolyte membrane was sufficiently removed as the same method as in the method of measuring the water uptake in Experimental Example 3). Then, the swelled electrolyte membrane was put into a solution obtained by adding $Fe^{2+}$ (8 ppm), that is, Fenton's reagent to $H_2O_2$ (6%) at 60° C. Thereafter, a change in the weight of the polymer electrolyte membrane as measured every 30 minutes, and the results were shown in FIG. 6. Chemical stability was evaluated by confirming these results.

Figure 6:
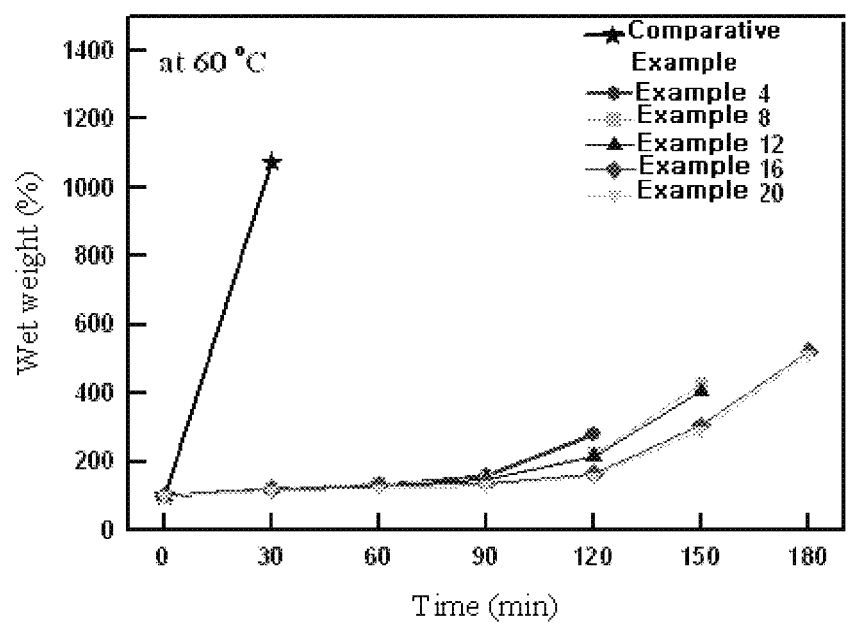
FIG. 6 shows results by evaluating chemical stability of the crosslinked SPEEK cation exchange membrane according to Example of the present invention.

As shown in FIG. 6, the weight of the SPEEK electrolyte membrane to which the crosslinker was not added was rapidly decreased after 30 minutes, such that after 60 minutes, chemical stability was decreased at a degree at which it was impossible to measure the change in the weight. On the other hand, it may be appreciated that in the case of the polymer electrolyte membrane in Example 20 according to the present invention, the change in the weight may be measured up to 180 minutes, such that the chemical stability was increased in accordance with the increase of the crosslinker.

Therefore, the crosslinked SPEEK cation exchange membrane prepared according to the present invention by mixing the crosslinker mixture composed of the first crosslinker containing two vinyl oxy groups and the second crosslinker containing three vinyl groups with the SPEEK polymer substituted with sodium at a suitable composition ratio and irradiating radiation may be prepared at room temperature in a short time and maintain high ionic conductivity in addition to a sufficient gel fraction and high chemical stability and dimensional stability, such that the crosslinked SPEEK cation exchange membrane may be applied as the ion exchange membrane, the fuel cell membrane, the flow battery membrane for a high capacitance secondary battery, the water treatment membrane, and the like, in various industrial fields.

In the method of preparing a crosslinked SPEEK cation exchange membrane according to the present invention, the ion exchange membrane may be prepared at room temperature in a short time.

In addition, the crosslinked SPEEK cation exchange membrane according to the present invention may have excellent chemical, thermal, mechanical, and electrochemical stability while significantly increasing a gelation and dimensional stability.

Further, the crosslinked SPEEK cation exchange membrane according to the present invention may be applied as an ion exchange membrane, the fuel cell membrane, the flow battery membrane for a high capacitance secondary battery, the water treatment membrane, and the like, in various industrial fields.

Hereinabove, although the present invention is described by restricted exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned exemplary embodiments, and the following claims as well as all modified equally or equivalently to the claims are intended to fall within the scope and spirit of the invention.

What is claimed is:
1. A method of preparing a crosslinked sulfonated poly (ether ether ketone) (SPEEK) cation exchange membrane, the method comprising:
   preparing a crosslinker mixture, wherein the crosslinker mixture comprises:

a first crosslinker represented by Chemical Formula 1, wherein the first crosslinker is present in an amount of 60 to 95 wt % of a total amount of the crosslinker mixture; and a second crosslinker, wherein the second crosslinker comprises at least one of triallyl isocyanurate or pentaerythritol triallyl ether, and is present in an amount of 5 to 40 wt % of the total amount of the crosslinker mixture;

preparing a mother liquor containing the crosslinker mixture, a SPEEK polymer substituted with sodium, and a solvent;

casting the mother liquor; and irradiating the mother liquor with a radioactive ray,

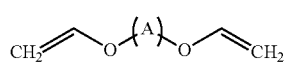

[Chemical Formula 1]

wherein A is at least one selected from the group consisting of

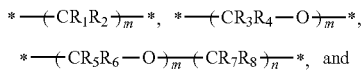

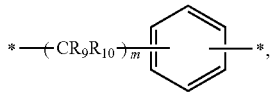

and each of m and n is independently an integer of 1 to 5, and wherein each of $R_1$ to $R_{10}$ is independently at least one selected from the group consisting of hydrogen, and a $C_1$~$C_6$ alkyl.

2. The method of claim 1, wherein the mother liquor contains 0.1 to 20 wt % of the crosslinker mixture, 1 to 30 wt % of the SPEEK polymer substituted with sodium, and 65 to 95 wt % of the solvent.

3. The method of claim 1, wherein the first crosslinker contains any one or at least two selected from 1,4-butanediol divinyl ether, 1,6-hexanediol divinyl ether, di(ethylene glycol) divinyl ether, tri(ethylene glycol) divinyl ether, tetra(ethylene glycol) divinyl ether, and 1,4-cyclohexanedimethanol divinyl ether.

4. The method of claim 1, wherein the solvent is any one or a mixture of at least two selected from a group consisting of N,N-dimethylacetamide, N-methyl-2-pyrrolidone, dimethylsulfoxide, tetrahydrofuran, dimethylformamide, toluene, cyclohexane, benzene, chlorobenzene, diphenyl ether, and 1,3,5-trimethylbenzene.

5. The method of claim 1, wherein the radioactive ray is any one selected from a group consisting of gamma ray, UV ray, and electron ray.

6. The method of claim 5, wherein the radioactive ray is the electron ray.

7. The method of claim 1, wherein the radioactive ray is irradiated at a dose rate of 0.1 to 10 kGy/min and an irradiation dose of 50 to 600 kGy.

8. The method of claim 1, wherein the radioactive ray is irradiated at a dose rate of 1 to 7 kGy/min and an irradiation dose of 200 to 400 kGy.

9. A crosslinked sulfonated poly(ether ether ketone) (SPEEK) cation exchange membrane prepared by the method of claim 1.

10. A fuel cell membrane comprising the crosslinked SPEEK cation exchange membrane of claim 9.

11. A water treatment membrane comprising the crosslinked SPEEK cation exchange membrane of claim 9.

* * * * *